United States Patent
Kronestedt et al.

(10) Patent No.: US 8,594,685 B2
(45) Date of Patent: Nov. 26, 2013

(54) MULTI-CARRIER FREQUENCY ASSIGNMENT METHOD

(75) Inventors: Fredric Kronestedt, Ekero (SE); Peter de Bruin, Gammelstad (SE); Peter Bjorken, Solna (SE)

(73) Assignee: Unwired Planet, LLC, Reno, NV (US)

( * ) Notice: Subject to any disclaimer, the term of this patent is extended or adjusted under 35 U.S.C. 154(b) by 320 days.

(21) Appl. No.: 12/674,376

(22) PCT Filed: Aug. 21, 2007

(86) PCT No.: PCT/SE2007/050564
§ 371 (c)(1),
(2), (4) Date: Feb. 19, 2010

(87) PCT Pub. No.: WO2009/025596
PCT Pub. Date: Feb. 26, 2009

(65) Prior Publication Data
US 2011/0151906 A1    Jun. 23, 2011

(51) Int. Cl.
*H04W 72/00* (2009.01)
*H04W 40/00* (2009.01)
*H04W 4/00* (2009.01)

(52) U.S. Cl.
USPC ............ 455/450; 455/446; 455/447; 370/329

(58) Field of Classification Search
USPC .................................... 455/446, 450
See application file for complete search history.

(56) References Cited

U.S. PATENT DOCUMENTS 6,154,655 A * 11/2000 Borst et al. .................... 455/451
6,832,074 B2 * 12/2004 Borras-Chia et al. ...... 455/67.13

FOREIGN PATENT DOCUMENTS

| EP | 1418776 A1 | 5/2004 |
| WO | 2006/037854 A1 | 4/2006 |
| WO | 2007/039513 A1 | 4/2007 |

* cited by examiner

*Primary Examiner* — Huy C Ho
(74) *Attorney, Agent, or Firm* — Nixon & Vanderhye P.C.

(57) ABSTRACT

In a method and a device for frequency planning of a multi carrier cellular radio system, a cost function that reflects a multi carrier function is used. Using the method and the device the frequency optimization can be made to take into account systems employing multi carrier techniques whereby the planning complexity and time for operators is reduced.

16 Claims, 2 Drawing Sheets

MULTI-CARRIER FREQUENCY ASSIGNMENT METHOD

TECHNICAL FIELD

The present invention relates to a method and a device for assigning frequencies in a frequency plan. In particular the present invention relates to a method and a system for assigning frequencies in a cellular radio system employing dual or multiple carrier techniques.

BACKGROUND

In GSM, packet data services with high peak rates are provided by means of EDGE technology. EDGE introduces a set of modulation and coding schemes (MCS). The different schemes result in different radio link bit rates and robustness, and are therefore optimal for use in different link quality regions (e.g. C/I). Link Quality Control (LQC), comprising link adaptation and hybrid ARQ (Incremental Redundancy, IR) algorithms, ensures that the most efficient scheme is always used for a mobile by means of quality information feedback from the mobile to the system, see Furuskär, S. Mazur, F. Müller and H. Olofsson, "EDGE: Enhanced data rates for GSM and TDMA/136 evolution", *IEEE Pers. Commun.*, vol. 6, pp. 56-66, June 1999. Typically the throughput is maximized or the packet delay is minimized (i.e., the number of retransmissions is minimized by increased coding and robustness) by the algorithms.

To further increase the EDGE packet data peak rate, dual carrier operation is currently being introduced in the GSM specifications. Dual carrier will allow the base station to transmit packet data to a mobile on two carriers simultaneously, thereby improving data throughput and reducing delay.

The GSM standard is based on TDMA, where each carrier frequency is allocated 8 timeslots. Each timeslot is allocated to carry either circuit switched voice or packet switched data traffic. A GSM operator is typically allocated a limited number of carrier frequencies by its country spectrum organizer. A common task for the operator is to assign the base stations in the network with frequencies to fulfill capacity (traffic) and coverage needs. Since spectrum is a limited resource, frequency reuse must be employed. The frequency reuse planning and optimization are very complex and time-consuming tasks for operators. In fact, the frequency assignment task is an NP complete problem, which would take impractically long time to solve exactly.

The problem of frequency planning has been researched for many years and there are many suggestions of solutions for this problem in the literature. A promising technique is to use heuristic algorithms for finding a good solution within a reasonable time and with reasonable complexity. Examples of heuristic algorithms are Tabu search, Simulating annealing, Local search, Genetic algorithms and Ant colony optimization. Such algorithms are often utilized in Automatic Frequency Planning (AFP) tools which is a practical approach that has been adopted by many wireless operators for solving the frequency assignment. In the AFP tool, a computer based optimization algorithm, such as one of the above mentioned, is used to find a solution, i.e. a frequency plan, that minimizes an objective function, which typically reflects total network interference. The goal is to minimize interference and maximize quality with a given frequency spectrum.

Further, the interference objective is typically defined by a number of cost functions that model network specifics and other limitations or constraints. The cost functions will give feedback on the implications of the frequency reuse throughout the network and is used by the optimization algorithm to converge to a better solution. In addition, the cost functions are used by the frequency planner to steer the optimizer to a desired solution, i.e. for prioritization of what the planner thinks is most, more or less important for the network. Example of cost functions are:

Interference Cost

A cost that is related to radio interference when frequencies are reused. It can be predicted (from propagation predictions in a planning tool) or measured interference from the system when two sectors reuse co or adjacent frequencies. Typically the interference cost is described by an interference matrix measured in the system see Timner, Y Bergenlid, M. "Estimating the inter cell dependency matrix in a GSM network", Vehicular Technology Conference, 1999. VTC 1999—Fall. IEEE VTS 50th. However, for new sites or where measurement data is missing, a predicted interference matrix is needed.

Neighbor Cost

Defines a cost if frequencies are reused between sectors defined as neighbors. It could e.g. be used to specify that adjacent frequencies may be used in neighbor cells, while using the same frequencies is forbidden. The neighbor function was introduced to give extra protection for sector neighbors when predicted interference is used since it is hard to predict interference with high accuracy.

Co-Site Cost

Defines a cost if frequencies are reused between sectors (or cells) of a site. It could e.g. be used to specify that adjacent frequencies may be used in a site is allowed while using the same frequency is forbidden. The co-site function was introduced to give extra protection for sectors in a site when predicted interference is used since it is hard to predict interference between sectors at a site accurately.

Co-Sector Cost

Defines a cost if frequencies are reused between transceivers of a sector. It could be that the sector antenna/combiner has requirements of frequency separation between transceivers to work satisfactory. This is mostly handled by the co-sector cost function.

Typically, the frequency planner sets a relative priority between these different functions. This is done by setting a higher cost to the most important task and so on. It is common that co-sector, co-site and neighbor have decreasing priority in order and the interference function has the lowest priority. The optimizer will then try to solve the most important costs first by making a trade-off for lower less important costs. With the setup above, it is beneficial to solve a neighbor cost (i.e. reuse between neighbors) before solving reuse between non-neighbors (i.e. for an interference cost between two other sectors) and so on. In this way, the solution will converge to a lower cost, i.e. less interference.

In practice, the frequency planner may have to repeat optimization runs with different priority settings after doing an analysis of the frequency plan to find the best trade off between the priorities and cost for each function. It may be that the optimizer might not solve all costs (since it is NP complete). This is inherent in the frequency assignment problem.

In the EDGE dual carrier solution, there will be a common LQC (link adaptation/hybrid ARQ) algorithm for both carriers, assigned to an EDGE mobile. As a result, the same MCS will be selected for both carriers, based on the quality information from both carriers assigned to the mobile for EDGE transmissions. Minimal changes of the GSM standard were desired and this was the best solution, considering both performance and cost. Further, this means that the carriers to be combined as dual carriers should be as equal as possible regarding the transmission characteristics, i.e. level of interference, in order to make it possible to select an optimal MCS that may work satisfactorily with both carriers simultaneously.

This may be a problem if the interference is higher on one of the carriers. In this case, it may (in practice) be impossible to transmit data using the same MCS on both carriers. A single carrier must then be used with reduced throughput or increased delay as a result. Thus, the dual carrier technique could not be fully utilized.

Furthermore, with current automatic frequency assignment procedures, it is not possible to assign frequencies for multi carrier operation considering the above requirement with equal interference on the multi carriers. State-of-the-art optimization procedures will make it possible to avoid reuse of frequencies in sectors and put requirements on the frequency separation between carriers of a sector. It is, however, not possible to put requirements on the level of interference between carrier pairs of the same sector which is needed for multi carrier operation. As a result, the optimized frequency plans may not provide that the new multi carrier transmission technique for improved throughput and reduced delay could be offered with a high probability in the network. Instead, it could be that multi carrier connections are downgraded to single carrier connections to a large extent although it is undesired.

Hence, there is a problem of how to generate frequency plans that take into account multi-carrier transmission techniques and which do not suffer from the problems outlined above.

SUMMARY

It is an object of the present invention to overcome or at least reduce some of the planning problems associated with the introduction of multi carrier transmission.

It is another object of the present invention to provide a method and a device that is capable to generate optimized frequency plans for cellular radio systems employing multi carrier transmission techniques.

These objects and others are obtained by the method and device as set out in the appended claims. Thus, by introducing a cost function in an automatic frequency assignment technique that reflects a multi carrier function, the frequency optimization can be made to take into account systems employing multi carrier techniques.

Such a cost function can be designed to impose a cost if the level of interference is above a predefined limit or alternatively impose a cost dependent on the difference of the level of interference for each carrier (frequency) pairs assigned to a particular sector.

The use of a cost function that takes multi frequency systems into account will drive the optimization to assign equal frequencies in terms of interference to sectors as well as minimize the total network interference. Frequency plans generated using such a cost function will support multi carrier operation in contrast to existing generated frequency plans.

Using a frequency planning device that includes a cost function reflecting the existence of multi carriers in a cellular radio system will allow for frequency planning for "dual carrier" as well as the more generalized case "multi carrier", i.e. planning for more than two simultaneously used carriers/frequencies. If more then two carriers are used, the complexity of the optimization procedure will however also increase.

BRIEF DESCRIPTION OF THE DRAWINGS

The present invention will now be described in more detail by way of non-limiting examples and with reference to the accompanying drawings, in which.

DETAILED DESCRIPTION

Figure 1:
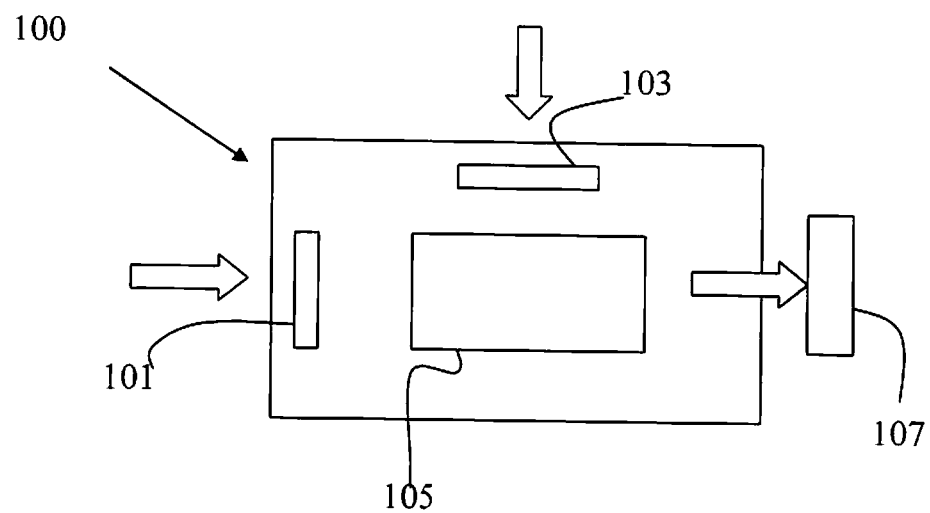
FIG. 1 is a general view illustrating a tool for assigning frequencies.

In FIG. 1 a general view of a tool 100 used for aiding in frequency planning is shown. The tool comprises an input terminal 101 for receiving data related to the system that an operator is to frequency plan. The tool, 100 also comprises a user input terminal 103 via which terminal 103 a user can input user specific data such as assigning different costs for different interferences, see below. The terminal 103 can also be used for stopping the execution of different optimization procedures executed by the frequency planning tool 100 at different stages as is described more in detail below. The input terminals 101 and 103 are connected to an optimization module 105. The optimization module 105 comprises a computer designed to execute different optimization procedures programmed into the computer in accordance with the input data received from the input terminals 101 and 103. The optimization module 105 is further connected to an output terminal 107. The out put terminal 107 can for example be a screen that can be viewed by a user of the tool 100. The output terminal can also be a general data output terminal, or it can be both a screen and a data output terminal.

To consider the multi carrier operation requirements, a new cost function can be included in the frequency assignment process. It can be described as function, g, of the cost of assigning a pair of frequencies to the EDGE radios in a sector:

$$C = g(c_1, c_2) \quad (1)$$

Where,
C Multi carrier cost for assigning a pair of frequencies, $f_1$ and $f_2$
$f_i$ Frequency i to be assigned as EDGE multi carrier frequency
$c_i$ Cost of assigning frequency i The fact that the cost function, g, is a function of the cost $c_i$ implies that the multi carrier cost preferably should be calculated as a last step when evaluating the current frequency plan, i.e. after all other cost functions in the optimization.

Below some examples of how to calculate C are described in more detail:

$$C = abs(c_1 - c_2) * P_{MC} \quad (2)$$

Or alternatively $$C = P_{MC}, \text{ if } abs(c_1 - c_2) > d \quad (3)$$

$$0, \text{ if } abs(c_1 - c_2) <= d$$

Where,
$P_{MC}$ is a user configurable priority setting for adjusting the multi carrier cost level
d is limit or the interference difference (specified by the user)

The cost C can be calculated for each frequency pair to be assigned as multiple carriers. For example, with three frequencies $f_1$ to $f_3$, the cost of assigning frequency $f_1$ should be $g(c_1, c_2) + g(c_1, c_3)$ and so on. It can then be advantageous to include a memory or table or similar for marking (or specifying) if a transceiver is multi carrier capable or not in the optimization tool.

Using a multi carrier cost function, existing optimization algorithms will get feedback on the multi carrier requirements and converge to a solution which is feasible for multi carrier systems. The multi carrier costs are simply added to the single carrier costs. It is then possible to prioritize between the different cost types using the priority $P_{MC}$ setting above. In fact, each type of cost function as described herein has an associated priority setting $P_C$ similar to $P_{MC}$ for this purpose.

In accordance with the embodiments described above, the multi carrier cost is implemented in the optimization run when calculating the cost for a specific frequency plan/assignment. Such a solution may increase the complexity and decrease the optimization speed. An alternative method is to apply the multi carrier cost after the single carrier optimization is stopped. In this case, the optimization is first run without multi carrier consideration, yielding a number of solutions that are ranked. A second optimization step is performed taking the multi carrier cost into consideration using the ranked frequency list. For example, select a solution that fulfills:

$$abs(c_1-c_2) < P_{MC} \quad (4)$$

(for at least k of the n combinations)

An advantage with the method is that the complexity increase and speed decrease would be less. However, a disadvantage would be that the solution would not be as good, i.e. less optimal.

Another solution, would be to perform an optimization for single carrier operation, using a combination of at least two single carrier frequencies, e.g., $f_{12}=(f_1, f_2)$. The cost could then be calculated as, e.g., $$C=(c_1+c_2)*P_1+abs(c_1-c_2)*P_2 \quad (5), \text{where}$$

Figure 2:
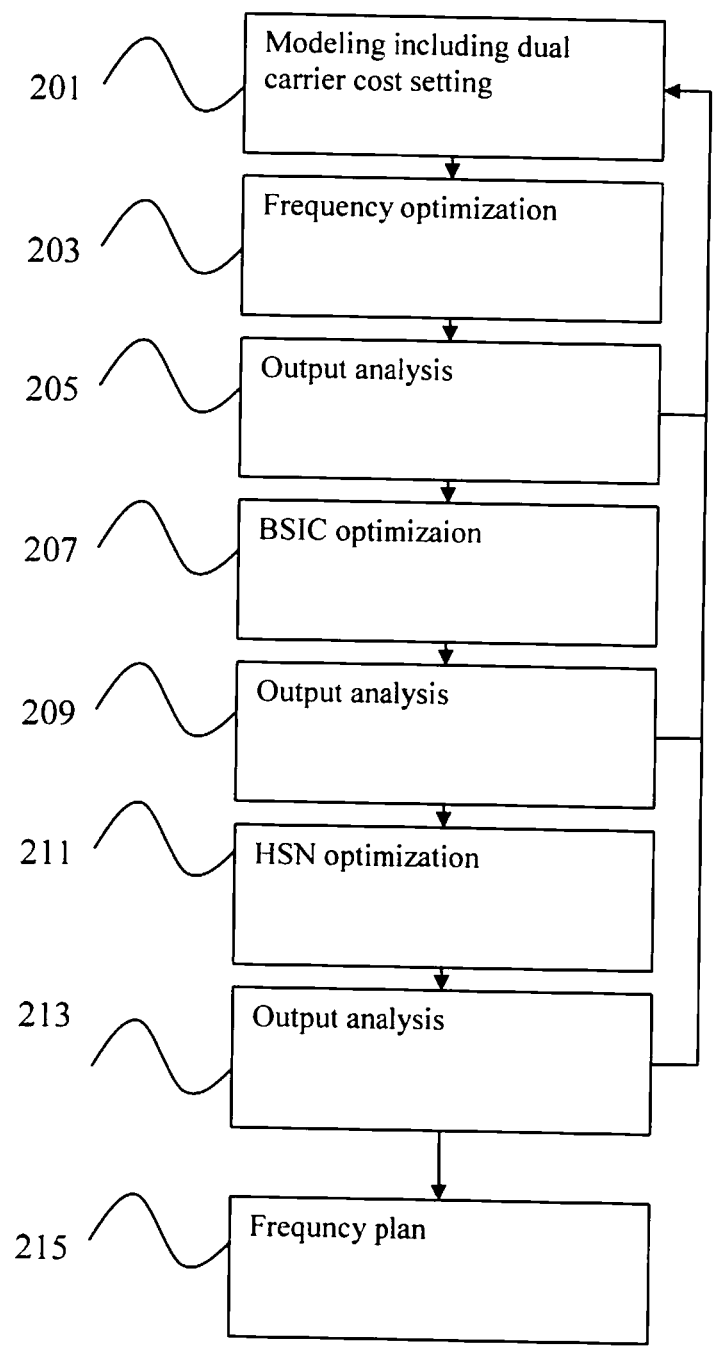
FIG. 2 is a flow chart illustrating a procedure for frequency planning.

$c_i$ Cost of assigning frequency i and
$P_i$ are user configurable priority settings for adjusting the cost level In FIG. 2 a flow chart illustrating a procedure for frequency planning is shown. In a first step 201 data is input and analyzed to ensure that data in put is correct. Also a model is constructed. The input data may for example be data related to the site, transceiver data, interference data, hand over data and other data that may be relevant to take into account when frequency planning. The model is constructed using the available specified spectrum. Transceivers having similar properties may also be grouped together. For example, all BCCH radios may be grouped in one group in order to facilitate allocation of interference costs.

The modeling in step 201 also includes specifying the interference costs and deciding which cost that is o be given the highest cost. Specifying costs is typically an important step which may have to be revisited at later stages during frequency allocation. The allocation of costs may for example have to be revisited if it turns out that an optimized frequency plan has undesired effects. One such example might be that if there is a reuse of frequencies for neighboring cells and such a plan is undesired, the cost for handover violation can be increased. In particular the allocation of cost includes a cost for multi-carrier as described hereinabove.

Next, in a step 203, a frequency optimization algorithm is executed based on the modeling parameters specified in step 201. In a typical optimization tool the cost is displayed to a user on a display such that the user can stop the optimization procedure when the cost is determined to be at a satisfactory level or if the optimization procedure takes too long. If the optimization tool finds a solution that gives a zero cost, i.e. can allocate a frequency to all transceivers without generating any cost, the frequency optimizer stops without involvement from a user. If the optimization tool does not find a solution that generates a zero cost it is typically adapted to try to find a better solution than the one already found.

Next, in a step, 205, when the frequency optimization procedure has been stopped, either because a zero solution is found or because a user or a predetermined threshold level has determined to stop the procedure, the outcome is analyzed. The analysis in step 205 typically involves an analysis of the remaining costs, i.e. the costs that the currently lowest cost as determined by the optimization procedure generates. For example, the analysis may include looking at those remaining costs and determine if they are acceptable or not. If the costs can be accepted the procedure proceeds to a next step 207, else if there are unacceptable costs remaining the frequency optimization procedure in step 203 can be run again, possibly with new cost weights for the different interference costs.

In step 207, a Base Station Identity Code (BSIC) optimization code is performed. If the optimization tool finds a solution that gives a zero cost optimizer stops without involvement from a user. If the optimization tool does not find a solution that generates a zero cost it is typically adapted to try to find a better solution than the one already found.

Next, in a step, 209, when the BSIC optimization procedure has been stopped, either because a zero solution is found or because a user or a predetermined threshold level has determined to stop the procedure, the outcome is analyzed. The analysis in step 209 typically involves an analysis of the remaining costs, i.e. the costs that the currently lowest cost as determined by the optimization procedure generates. For example, the analysis may include looking at those remaining costs and determine if they are acceptable or not. If the costs can be accepted the procedure proceeds to a next step 211, else if there are unacceptable costs remaining optimization procedure can be run again, possibly with new cost weights set in step 201 for the different interference costs.

Thereupon, in step 211, a Hopping Sequence Number (HSN) optimization code is performed. If the optimization tool finds a solution that gives a zero cost optimizer stops without involvement from a user. If the optimization tool does not find a solution that generates a zero cost it is typically adapted to try to find a better solution than the one already found.

Next, in a step, 213, when the HSN optimization procedure has been stopped, either because a zero solution is found or because a user or a predetermined threshold level has determined to stop the procedure, the outcome is analyzed. The analysis in step 211 typically involves an analysis of the remaining costs, i.e. the cost that the currently lowest cost as determined by the optimization procedure generates. For example, the analysis may include looking at those remaining costs and determine if they are acceptable or not. If the costs can be accepted the procedure proceeds to a next step 215, else if there are unacceptable costs remaining optimization procedure can be run again, possibly with new cost weights set in step 201 for the different interference costs.

Finally, in step 215, the final frequency plan including a frequency plan and BSIC and HSN plans is determined and output from the frequency planning tool.

The method and system as described above is applicable to all radio network systems with dual- or multi-carrier capabilities, using frequency planning.

There may be a potential to use AFP to optimize bit rates (or throughput) at the cell border for Long Term Evolution (LTE) systems standardized by 3gpp. In this case, a (small) portion of the frequency spectrum could be allocated each cell, similar to MRP (Multiple Reuse Patterns, used in GSM), while the main part of the spectrum is used for 1-reuse planning. If there is an advantage to plan for "balanced or equal" sub-carriers according to the invention, AFP could be used to optimize sub-carriers to each cell.

By using the method and system as described herein Multi carrier (or dual carrier) systems can be assigned frequencies using automatic frequency planning methods which reduce the planning complexity and time for operators. It would be very time consuming to manually do multi carrier planning of wireless networks. In the end, it will make sure that multi carrier (or dual carrier) operation can be utilized to a large extent, which increases throughput and decreases delay for mobile users. Without this technique there is a risk that downgrading to single carrier operation would appear to a large extent.

The invention claimed is:

1. A method of assigning frequencies in a cellular radio system where the cellular radio system employs a multi-carrier technique, wherein the method comprises:
    collecting data related to the cellular radio system;
    assigning a multi-carrier function cost for a multi-carrier function, wherein the multi-carrier function cost represents a level of interference associated with an assignment of frequencies to two or more carriers in a same cell or in a same sector; and
    assigning frequencies to the two or more carriers based on the assigned mulit-carrier function cost.

2. The method of claim 1, wherein assigning the multi-carrier function cost for the multi-carrier function comprises assigning a multi-carrier function cost only when the level of interference associated with the assignment of the frequencies to the two or more carriers meets a threshold requirement.

3. The method of claim 1, wherein assigning the multi-carrier function cost for the multi-carrier function comprises assigning the multi-carrier function cost dependent on a difference in the levels of interference for each carrier pair assigned to a particular sector.

4. The method according to claim 1, further comprising adjusting the multi-carrier function cost based on a configurable priority setting.

5. The device according to claim 1, wherein the multi-carrier function cost is applied in conjunction with an optimization run involving calculation of the cost for a specific frequency plan/assignment for other cost functions.

6. The method according to claim 1, wherein the multi-carrier function cost is applied after first having performed other cost functions resulting in a single carrier cost function.

7. The method according to claim 6, wherein the other cost functions comprise at least one of an interference cost, a neighbor cost, a co-site cost, and a co-sector cost.

8. The method according to claim 1, wherein the multi-carrier function cost is calculated using combinations of at least two single carrier frequencies.

9. A device for assigning frequencies in a cellular radio system where the cellular radio system employs a multi-carrier technique, the device comprising:
    a computer including a processor to implement an optimization function, said processor configured to:
        assign a cost for a multi-carrier function, wherein the cost represents a level of interference associated with an assignment of frequencies to two or more carriers in a same cell or in a same sector; and
        assigning frequencies to the two or more carriers based on the assigned cost.

10. The device of claim 9, wherein the processor is configured to assign the cost only when the level of interference associated with the assignment of the frequencies to the two or more carriers meets a threshold requirement.

11. The device of claim 9, wherein the processor is configured to assign the cost dependent on a difference in the levels of interference for each carrier pair assigned to a particular sector.

12. The device according to claim 9, wherein the processor is configured to adjust the cost based on a configurable priority setting.

13. The device according to claim 9, wherein the processor is configured to apply the cost in conjunction with an optimization run involving calculation of the cost for a specific frequency plan/assignment for other cost functions.

14. The device according claim 9, wherein the processor is configured to apply the cost after first having performed other cost functions resulting in a single-carrier cost function.

15. The device according to claim 14, wherein the other cost functions comprise at least one of an interference cost, a neighbor cost, co-site cost, and a co-sector cost.

16. The device according to claim 9, wherein the processor is configured to calculate the cost using combinations of at least two virtual single carrier frequencies.

* * * * *

UNITED STATES PATENT AND TRADEMARK OFFICE
CERTIFICATE OF CORRECTION

PATENT NO. : 8,594,685 B2  
APPLICATION NO. : 12/674376  
DATED : November 26, 2013  
INVENTOR(S) : Kronestedt et al.

Page 1 of 1

It is certified that error appears in the above-identified patent and that said Letters Patent is hereby corrected as shown below:

Title page, illustrative figure, for Tag "207", in line 1, delete "optimizaion" and insert therefor -- optimization --.

In the Drawings

Fig. 2, Sheet 2 of 2, for Tag "207", in line 1, delete "optimizaion" and insert therefor -- optimization --.

In the Specification

Column 4, line 1, delete "then" and insert therefor -- than --;

Column 4, line 46, delete "frequency i" and insert therefor -- frequency i. --;

Column 4, line 63, delete "user)" and insert therefor -- user). --;

Column 5, line 27, delete "combinations)" and insert therefor -- combinations). --;

Column 5, line 40, delete "level" and insert therefor -- level. --;

Column 5, line 53, delete "is o be" and insert therefor -- is to be --;

In the Claims

Column 7, line 30, in Claim 1, delete "mulit-carrier" and insert therefor -- multi-carrier --;

Column 7, line 45, in Claim 5, delete "device" and insert therefor -- method --; and Column 8, line 28, in Claim 11, delete "pairassigned" and insert therefor -- pair assigned --.

Signed and Sealed this  
Third Day of February, 2015

Michelle K. Lee  
*Deputy Director of the United States Patent and Trademark Office*